US006370544B1

(12) United States Patent
Krebs et al.

(10) Patent No.: US 6,370,544 B1
(45) Date of Patent: Apr. 9, 2002

(54) SYSTEM AND METHOD FOR INTEGRATING ENTERPRISE MANAGEMENT APPLICATION WITH NETWORK MANAGEMENT OPERATIONS

(75) Inventors: Lawrence W. Krebs, Loudoun County; Wayne R. Fuller, Fairfax County; Edwin J. Zakrzewski, Reston-Fairfax County, all of VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/098,341

(22) Filed: Jun. 17, 1998

Related U.S. Application Data
(60) Provisional application No. 60/050,089, filed on Jun. 18, 1997.

(51) Int. Cl.[7] ............................................. G06F 17/30
(52) U.S. Cl. ........................... 707/104.1; 707/1; 707/3; 707/4; 709/201; 345/700; 705/1; 705/2
(58) Field of Search ................................. 707/104, 100, 707/102, 1, 3, 4, 104.1; 364/401; 705/2, 1; 345/700; 709/201

(56) References Cited

U.S. PATENT DOCUMENTS

| | | | | | |
|---|---|---|---|---|---|
| 5,301,105 A | * | 4/1994 | Cummings, Jr. | ............ | 364/401 |
| 5,421,012 A | * | 5/1995 | Khoyi et al. | ................ | 709/107 |
| 5,524,253 A | * | 6/1996 | Pham et al. | ................ | 709/202 |
| 5,551,030 A | * | 8/1996 | Linden et al. | .............. | 707/102 |
| 5,634,124 A | * | 5/1997 | Khoyi et al. | ................ | 707/103 |
| 5,664,109 A | * | 9/1997 | Johnson et al. | ................ | 705/2 |
| 5,878,431 A | * | 3/1999 | Potterveld et al. | .......... | 707/103 |
| 5,881,378 A | * | 3/1999 | Hayashi et al. | ............. | 707/100 |
| 5,916,307 A | * | 6/1999 | Piskiel et al. | ................ | 709/300 |
| 6,018,742 A | * | 1/2000 | Herbert, III | ................ | 707/102 |
| 6,058,378 A | * | 5/2000 | Clark et al. | .................... | 705/37 |
| 6,167,564 A | * | 12/2000 | Fontana et al. | ................ | 717/1 |
| 6,249,786 B1 | * | 6/2001 | Wadewitz | ...................... | 707/6 |
| 6,256,676 B1 | * | 7/2001 | Taylor et al. | ................ | 709/246 |

* cited by examiner

Primary Examiner—Jack M. Choules
Assistant Examiner—Cheryl Lewis
(74) Attorney, Agent, or Firm—Jim Zegeer

(57) ABSTRACT

The invention is directed to an enterprise management integration tool for providing a centralized repository for storage and processing of information related to the execution of the enterprise management functions. This is accomplished through the use of a Relational Database Management System (RDBMS) and specific database schema that model the enterprise components and services being managed. The interface with this database will be in one of two preferred forms: (1) software bridges to specific management applications; (2) standardized Structured Query Language (SQL) to applications that support the use of SQL. The database-centric approach provides a framework for integration of myriad applications (software programs) based on the needs of the enterprise management personnel. It also provides mechanisms for distribution of management information between enterprise management sites to increase the robustness and fault resistance of the enterprise management system, support sharing of management responsibilities between enterprise management sites, and allow for distribution of management information to organizations and personnel indirectly associated with the enterprise management process (e.g., billing and finance, engineering, etc.).

2 Claims, 2 Drawing Sheets

FIGURE 1

| Management Activity Domain | General Description | Required Capabilities |
|---|---|---|
| Client Contact Point | • Respond to User Problem<br>• Respond to User Inquiries<br>• Respond to User Service Requests | • Work Flow Management<br>  - Trouble Ticket<br>  - Service Request<br>• Expert System Support for Problem Resolution |
| Second and Third Level Support | • Technical Support to Client Contact Point<br>• Technical Support to Fault Monitoring | • Ability to Isolate Fault Locations<br>• Reactive Testing and Diagnostics<br>• Ability to Reset/Reconfigure Faulted Components |
| Fault Tracking | • Record Keeping for Tracking Progress in Fault Resolution | • Same as Client Contact Point |
| Change Control | • Manage Progress of Service Orders | • Work Flow Management System for Tracking and Managing Service Request |
| Performance Monitoring | • Monitor and Evaluate Infrastructure Performance and Utilization<br>• Analysis of faults | • Ability to Poll Infrastructure Components, Element Managers, & Intelligent Agents<br>• Ability to Filter Events<br>• On-Line Ability to develop Rule-based Algorithms for Performance &Fault Analysis |
| Planning and Design | • Plan and design Expansion and Improvements to Infrastructure | • Network Modeling and Simulation Tool Linked to Configuration Database<br>• Import of Traffic Statistics and Infrastructure Usage Information<br>• Project Management and Tracking Tools |
| Implementation and Maintenance | • Implement Change Orders and Work Requests<br>  - Site Surveys<br>  - Build out<br>  - Installation, Testing and Commissioning<br>• Maintain Infrastructure Components | • update Configuration Databases with Current "As Built" Description of the Infrastructure<br>• Document Progress of Provisioning<br>• Document Maintenance History of Infrastructure Components |
| System Administration | • Traditional System Administrative Functions in Distributed Processing Environments<br>  - Client Systems<br>  - Management Systems | • Remote Management of Distributed Processing Elements<br>• Backup and Retrieval<br>• Document Maintenance History of Infrastructure Components |
| Fault Monitoring | • Monitor Infrastructure, Detect Faults, Escalate Faults to Second Level Support, and Notify Client Contact Point | • Detect and Isolate Fault<br>• Initiate Trouble Ticket<br>• Expert System for Alarm Filtering and Correlation |
| Finance and Billing | • Costing of Services Provided to Customers and Billing of Customers | • Collection and Storage of Network and System Usage Data<br>• Correlation of Network and System Usage with Customer Provided Service<br>• Correlation of Faults and Performance with Service Level Agreements |
| Security | • Ensure Secure Communications & Security Administration, Detect Security Violations &Initiate Recovery Procedures | • Labeling of Classified Informaton for Storage<br>• Definition of Access Levels and Attributes<br>• Control of Access |

SYSTEM AND METHOD FOR INTEGRATING ENTERPRISE MANAGEMENT APPLICATION WITH NETWORK MANAGEMENT OPERATIONS

The present application is the subject of U.S. provisional application Ser. No. 60/050,089 filed Jun. 18, 1997 and entitled SYSTEM FOR INTEGRATING ENTERPRISE MANAGEMENT APPLICATION WITH NETWORK MANAGEMENT OPERATIONS.

INTRODUCTION

The mechanism for the electronic transfer of information from a source to a destination can, in the simplest of terms, be described as consisting of end user equipment such as telephone handsets, computer workstations, etc., connected by a transmission media such as fiber optic, coaxial cable and RF wireless links. In today's Information Technology jargon, this is commonly referred to as the "Enterprise" and consists of Local and Metropolitan Area Networks (LAN/MAN) that are associated with the primary business operations, connected via high-speed trunks to create Wide Area Networks.

The management of this enterprise has traditionally been limited to some minimal management of the end user equipments or the "systems" and management of the transmission media or the "network", with the functionality of these two different management domains executed by different organizations, using different suites of management tools. However, as "end users" demand more than simple telephony and e-mail services, and networks expand in dimension and complexity, these separate and distinct methods of management cannot continue to provide proactive maintenance of Service quality. Services are the business processes supported by the underlying networks and equipment. Layered on top of this is the evolving need to have services associated with other offices and organizations such as billing and finance, network and systems engineering, customer service, and service provisioning/maintenance included in overall Enterprise Management process. FIG. 1 illustrates just some of the many activities that can be associated with the domain of enterprise management. These activities are based on the OMNI Point reference model presented by the Network management Forum.

"Out-of-the-Box" management applications generally address only parts of the necessary integrated management capability. Some of the management applications vendors have formed alliances or relations and have provided some degree of integration, but these are generally limited to specific, "highly desirable" functions such as the spawning of a maintenance trouble ticket based on receipt of specific alarms from network or system elements. Some vendors are also seeking to provide complete solutions but, because of the widespread and expanding nature of the Enterprise Management process, can only address well-specified subsets of the overall process.

SUMMARY OF THE INVENTION

In summary, the object of this invention is to provide an enterprise management integration tool to provide a centralized repository for storage and processing of information related to the execution of the enterprise management functions. This is accomplished through the use of a Relational Database Management System (RDBMS) and specific database schema that model the enterprise components and services being managed. The interface with this database will be in one of two preferred forms: (1) software bridges to specific management applications; (2) standardized Structured Query Language (SQL) to applications that support the use of SQL.

The database-centric approach for this invention provides a framework for integration of myriad applications (software programs) based on the needs of the enterprise management personnel. It also provides mechanisms for distribution of management information between enterprise management sites to increase the robustness and fault resistance of the enterprise management system, support sharing of management responsibilities between enterprise management sites, and allow for distribution of management information to organizations and personnel indirectly associated with the enterprise management process (e.g., billing and finance, engineering, etc.).

DESCRIPTION OF THE DRAWINGS

The above and other objects, advantages and features of the invention will become more apparent when considered with the following specification and accompanying drawings wherein:

FIG. 1 is a table illustrating some of the many data activity domains that can be managed under the invention.

DETAILED DESCRIPTION OF THE INVENTION

Practical Applications

Figure 2:
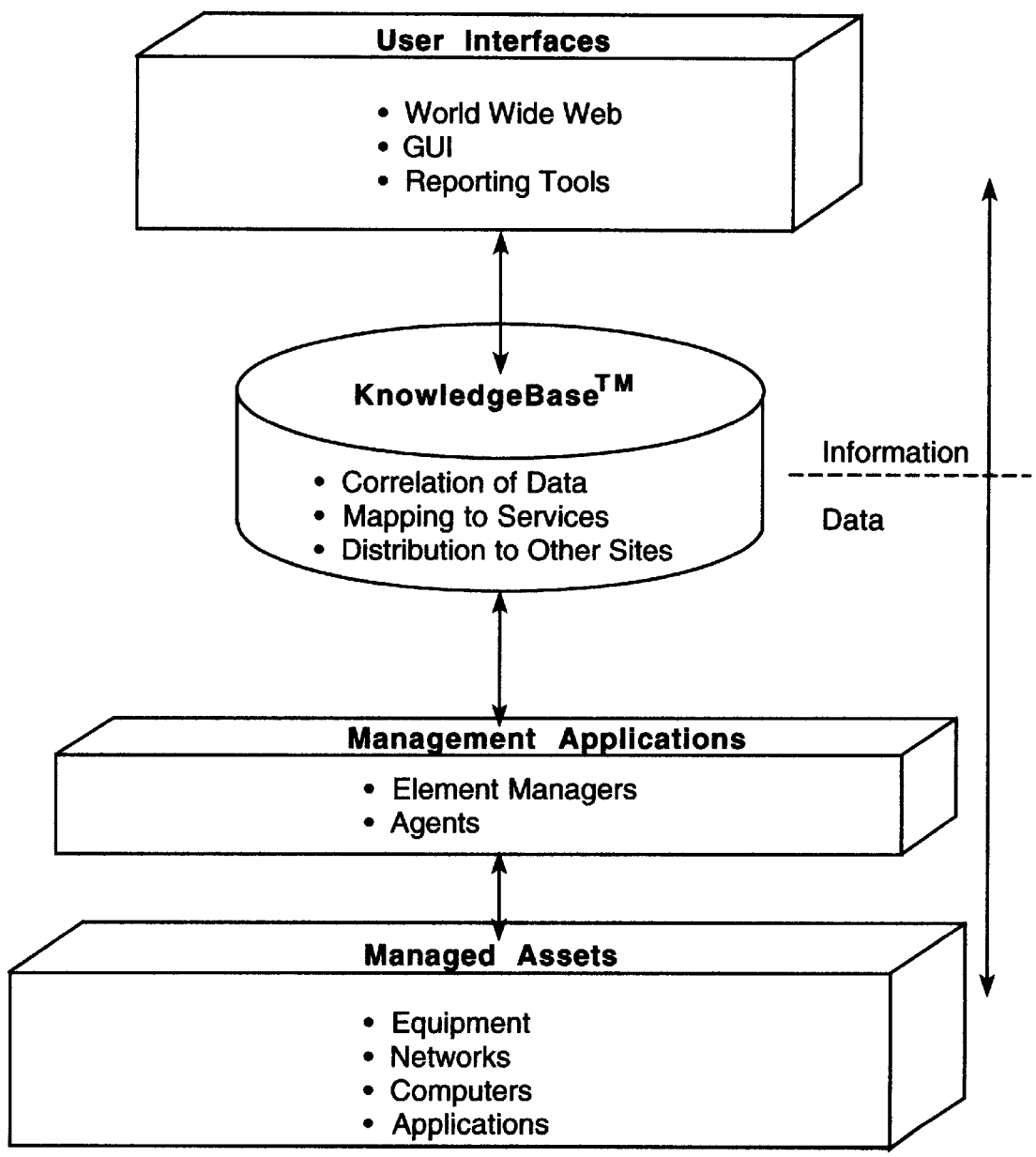
FIG. 2 is a schematic illustration of how the invention integrates enterprise management application with enterprise network management operations.

The invention can be applied to a variety of enterprise management needs, starting from simple network management of network domains. Specific examples of some practical applications are the follows:

- collection and storage of performance and status information of the end user equipment and processes as well as the performance and status of the long-haul telecommunications media;
- correlation of end user performance with fault conditions in end user equipment and telecommunications network equipment;
- correlation of equipment connectivity with services, and quality of services provided;
- provision of network performance and usage statistics for engineering analysis using commercial off-the-shelf (COTS) simulation tools;
- provision of network and end user equipment usage with quality of service provided for customer billing;
- support for customer network management system interfaces for sharing of specific information to virtual private networks;
- access security to insure privacy and access availability of information;
- support to workforce management for dispatch of maintenance personnel to physical locations of network faults;
- support to workforce management for dispatch of service provisioning to physical location of network adds/drops/moves;
- support to workforce management for customer care in execution of help desk and service scheduling;
- support to external organizations and offices through the user of web-based access to enterprise management status information.

While the invention has been described in relation to preferred embodiments of the invention, it will be appreciated that other embodiments, adaptations and modifications of the invention will be apparent to those skilled in the art.

What is claimed is:

1. A method for integrating enterprise management applications outside of the management application comprising:

provide a centralized storage depository data base for storage and processing of information related to the execution of the enterprise management function and using a relational database management system and specific database schema that model the enterprise components and services being managed, and interfacing said centralized storage database via one of the following:
   a) software bridges to specific management applications, and
   b) standardized query language (SQL) to applications that support the use of SQL.

2. A system for integrating enterprise management applications outside of the management application comprising:

a centralized storage depository data base for storage and processing of information related to the execution of the enterprise management function, means for using a relational database management system and specific database schema for modelling enterprise components and services being managed, and means for interfacing said centralized storage database via one of the following:
   a) software bridges to specific management applications, and
   b) standardized query language (SQL) to applications that support the use of SQL.

* * * * *